(12) United States Patent
Peng et al.

(10) Patent No.: US 8,687,980 B2
(45) Date of Patent: Apr. 1, 2014

(54) FEEDBACK LIGHT TUNING DEVICE AND OPTICAL COMMUNICATION SYSTEM AND METHOD USING THE SAME

(75) Inventors: Tz Shiuan Peng, Taipei (TW); Lon Wang, Taipei (TW)

(73) Assignee: National Taiwan University, Taipei (TW)

( * ) Notice: Subject to any disclaimer, the term of this patent is extended or adjusted under 35 U.S.C. 154(b) by 108 days.

(21) Appl. No.: 13/541,656

(22) Filed: Jul. 3, 2012

(65) Prior Publication Data

US 2013/0188958 A1 Jul. 25, 2013

(30) Foreign Application Priority Data

Jan. 20, 2012 (TW) .............................. 101102516 A (51) Int. Cl.
*H04B 10/572* (2013.01)
(52) U.S. Cl.
USPC ......................................................... 398/196

(58) Field of Classification Search
CPC .. H04B 10/501; H04B 10/503; H04B 10/504; H04B 10/572
USPC ......................................................... 398/196
See application file for complete search history.

(56) References Cited

U.S. PATENT DOCUMENTS

| | | | |
|---|---|---|---|
| 5,684,590 A | 11/1997 | Sanders et al. | |
| 6,025,915 A | 2/2000 | Michal et al. | |
| 6,744,966 B2 | 6/2004 | Ang et al. | |
| 7,142,355 B2 | 11/2006 | Huang et al. | |
| 2009/0154506 A1* | 6/2009 | Koyama et al. | 372/20 |

* cited by examiner

*Primary Examiner* — Leslie Pascal
(74) *Attorney, Agent, or Firm* — Chih Feng Yeh; Huntington IP Consulting Co., Ltd.

(57) ABSTRACT

A feedback light tuning device and the optical communication system and method using the same are provided. By tuning the feedback light, the mechanism can completely correct the mean-wavelength drift up to 30 nm or 19400 ppm. The mechanism can be applied to various harsh environments which cause the mean-wavelength drift, so as to achieve a required stable mean-wavelength for the light source and to increase the acceptable range of radiation dose.

16 Claims, 6 Drawing Sheets

FEEDBACK LIGHT TUNING DEVICE AND OPTICAL COMMUNICATION SYSTEM AND METHOD USING THE SAME

CROSS-REFERENCE TO RELATED APPLICATION

This application claim priority to a TAIWAN patent application numbered 101102516 filed on Jan. 20, 2012 (TAIWAN time), which is hereby incorporated by reference in its integrity.

BACKGROUND OF THE RELATED ART

1. Technical Field

The invention relates to a feedback light tuning technique and, in particular, to a technique that applies to superfluorescent fiber source (SFS) and reduces mean wavelength drifts caused by environment changes using feedback light tuning.

2. Related Art

In both engineering and scientific domains, optical communication systems are important tools because of their high sensitivity and stability for sensing applications. In particular, they are immune to electromagnetic interference (EMI).

The light source is an essential element in an optical communication system with demands of high output power, broad bandwidth, and stable mean wavelength. Since SFSs doped with rare earth (RE) ions have been developed, the light source can meet the above requirements. In particular, the optical fiber doped with erbium is commonly used.

The SFS is also considered as the most appropriate light source for high precision interference fiber optic gyroscope (IFOG). The IFOG is a tool for sensing the rotational rate based on optical interference. The precision of state-of-art IFOGs has met the requirements of aerospace navigation and become one of the most precise orientation systems. Recently the IFOGs have demands of been employing in the space environment, such as the navigation of the satellites. The primary radiation effect of the SFS is power loss and mean wavelength drift, which is inversely proportional to the scale factor of an IFOG. To meet the requirement of aerospace navigation, the scale factor drift needs below 10 parts per million (ppm). Therefore, it is important to find out how to reduce the mean wavelength drift of an SFS.

The mean wavelength drift of a usual SFS can reach up to thousands of ppm. Consequently, some vendors propose to directly add a filter to the output terminal of the SFS, such as those in U.S. Pat. Nos. 7,142,355, 5,684,590, 6,744,966, and 6,025,915. It is used to restrict the peak output around a limited range (e.g., around 1530 nm). This shrinks the drift (e.g., to 13 ppm). However, this method also reduces the power and bandwidth (e.g., ≤10 nm), unable to satisfy the requirements on the light source for high-precision gyroscopes. Moreover, using the filter to achieve the stability of the mean wavelength of the SFS in the prior art has to sacrifice the output power or bandwidth to some extent. In a radiation environment, the SFS cannot meet the requirements of the light source for high-precision gyroscopes; i.e., high output power, wide bandwidth (30 nm) and stability in the mean wavelength at the same time.

Lately, optical communication systems have demand to be applied in harsh environments, such as those with a large temperature variation or a lot of radiation. Therefore, to develop a technique to stabilize the mean wavelength of the SFS in harsh environments and to increase the range of acceptable radiation dose is an important topic in the field.

SUMMARY

To effectively diminish mean wavelength drift of the SFS in harsh environments, the invention discloses a novel and useful feedback light tuning device along with the optical communication system and method using the same that can rapidly stabilize the mean wavelength drift caused by the harsh environments.

The disclosed feedback light tuning device is used in an optical communication device with a SFS and a light source output terminal. It includes: a wide band splitter, a mean wavelength detection module, and a feedback light control module. The wide band splitter is connected with the SFS in the optical communication device via an optical fiber, thereby receiving a first-direction emission emitted by the SFS. After splitting the first-direction emission into a first beam and a second beam, the wide band splitter outputs the first beam to the light source output terminal and feeds back the second beam. The mean wavelength detection module is connected with the wide band splitter via an optical fiber for receiving the second beam fed back from the wide band splitter, thereby computing the mean wavelength drift. The feedback light control module is electrically connected with the mean wavelength detection module and connected to the SFS via an optical fiber for receiving the second-direction emission emitted by the SFS in the opposite direction of the first emission. The feedback light control module according to an electrical signal based on the mean wavelength drift from the mean wavelength detection module generates and controls feedback light which propagates into the SFS to cause gain competition. Such gain competition can tune and correct the mean wavelength of the first-direction emission.

Besides, the disclosed optical communication system using the feedback light tuning technique emits light via the light source output terminal. The system includes: an SFS, a wide band splitter, a mean wavelength detection module, and a feedback light control module. The SFS emits emission. The emission is divided into first-direction emission and second-direction emission according to the transmission direction. The wide band splitter is connected with the SFS via an optical fiber for receiving the first-direction emission and splitting it into a first beam and a second beam. Afterwards, the wide band splitter outputs the first beam via the light source output terminal and feeds back the second beam. The mean wavelength detection module is connected with the wide band splitter via an optical fiber for receiving the feedback second beam and computing the mean wavelength drift. The feedback light control module is electrically connected with the mean wavelength detection module and with the SFS via an optical fiber for receiving the second-direction emission emitted by the SFS in the direction opposite to the first-direction emission. The feedback light control module according to the electrical signal based on the mean wavelength drift from the mean wavelength detection module generates and controls feedback light which propagates into the SFS to cause gain competition. Such gain competition can tune and correct the mean wavelength drift of the first-direction emission The disclosed optical communication method using the feedback light tuning technique includes the steps of: producing emission, which is divided, according to transmission direction, into first-direction emission and second-direction emission opposite to the first-direction emission; splitting the first-direction emission into a first beam and a second beam and transmitting the first beam and feeding back the second beam; receiving the feedback second beam to compute a mean wavelength drift; and producing feedback light according to the mean wavelength drift and emitting the feedback light to cause gain competition, thereby correcting and tuning the mean wavelength of the emission.

As described above, the SFS is connected with the feedback light control module. When the feedback light tuning technique is activated, the mean wavelength drift caused by harsh environments can usually be reduced to 1%, preferably at least 0.1%, and most preferably at least 0.01%. The working range is the temperature variation or radiation dose causing the mean wavelength drift of 30 nm or 19400 ppm when the feedback light tuning technique is not activated. In comparison with the prior art in which a filter is employed to attain stability in the mean wavelength of the SFS, the proposed feedback light tuning technique can greatly increase both bandwidth and power. Therefore, the light source efficiency is superior to the prior art. The invention is very suitable for aerospace technology and nuclear facilities, i.e., for environments with large temperature variation or irradiation. The applications include communications, sensings, and navigations.

According to one embodiment of the invention, the feedback light control module is connected with the SFS and the mean wavelength detection module. The feedback light control module can adjust the mean wavelength of the SFS.

Briefly, the invention discloses an optical fiber assembly operating in harsh environments. In particular, it stabilizes the mean wavelength drift of a RE-doped SFS. The stability of the mean wavelength thanks to the function of the feedback light control module.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

Figure 1:
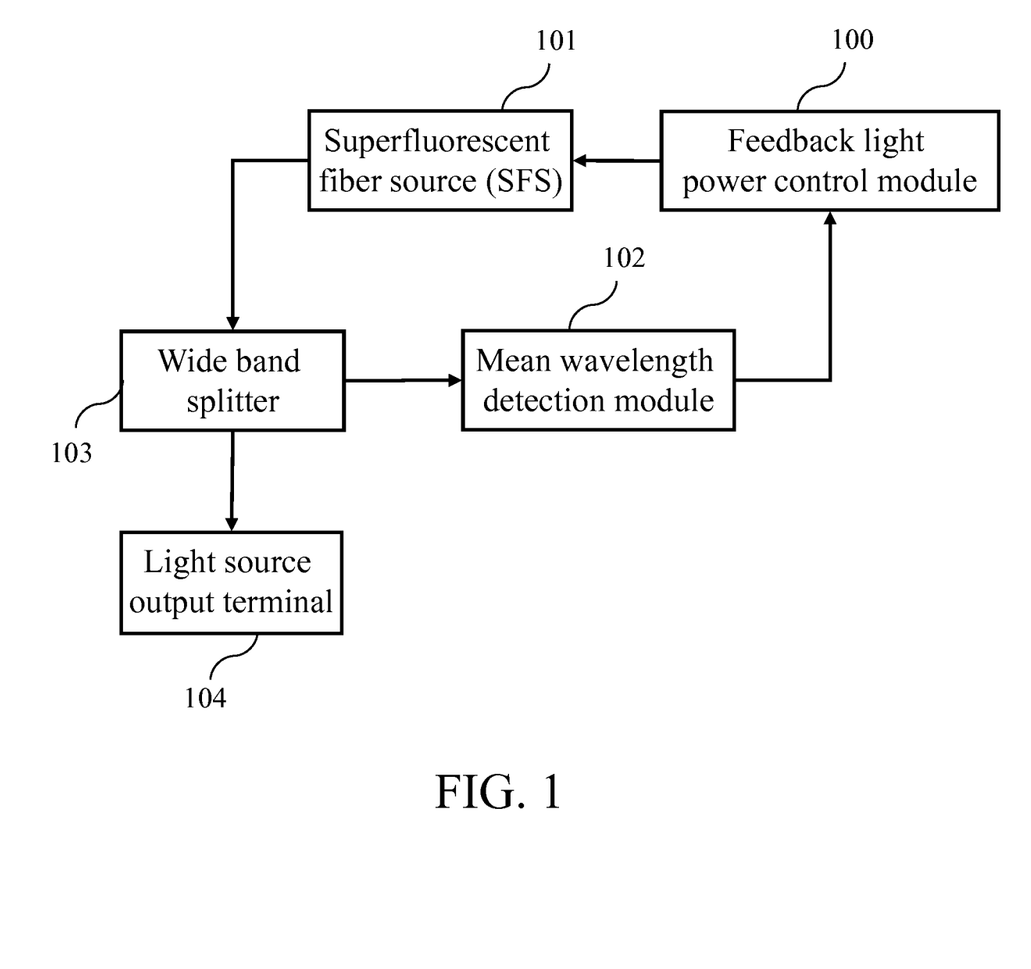
FIG. 1 is a block diagram of the disclosed feedback light tuning device.

Please refer to FIG. 1, which is a block diagram of the disclosed feedback light tuning device. The device is used in an optical communication device with an SFS 101 and a light source output terminal 104. The feedback light tuning device includes: a wide band splitter 103, a mean wavelength detection module 102, and a feedback light control module 100. The wide band splitter 103 is connected via an optical fiber with the SFS 101 for receiving first-direction emission emitted by the SFS 101. After the first-direction emission is split into a first beam and a second beam, the first beam is output to the light source output terminal 104 and the second beam is fed back to the mean wavelength detection module 102. In practice, the SFS 101 uses a light-emitting element (e.g., laser diode) to generate amplified spontaneous emission (ASE). The emission has two directions. The one in the same direction as the output of the light source is defined as the second-direction emission, the other opposite to the output of the light source the first-direction emission. It should be explained that the optical fiber is a cylindrical waveguide structure. Although this specification uses the optical fiber in the description, the invention is not restricted to this example. Any cylindrical waveguide structure that can transmit light should be included in the scope of the invention.

The mean wavelength detection module 102 is connected via an optical fiber with the wide band splitter 103 for receiving the second beam fed back from the wide band splitter 103 to compute the mean wavelength drift. In practice, the mean wavelength detection module 102 can be a spectrometer. The mean wavelength drift is represented by a number in units of ppm. It is computed by using the formula $\Delta\bar{\lambda}/\bar{\lambda}$, where $\Delta\bar{\lambda}$ is the mean wavelength drift, $\bar{\lambda}$ is the mean wavelength. The mean wavelength is defined by $$\bar{\lambda} = \frac{\int \lambda \cdot P(\lambda) d\lambda}{\int P(\lambda) d\lambda},$$

where $P(\lambda)$ is the power spectrum. The details of computing the mean wavelength drift using the spectrometer belongs to the prior art and is not further described herein.

The feedback light control module 100 electrically connects to the mean wavelength detection module 102 and to the SFS 101 in the optical communication device via an optical fiber. It receives the second-direction emission from the SFS 101, and emits feedback light according to the mean wavelength drift calculated by the mean wavelength detection module 102. The feedback light is emitted to the SFS 101 for causing gain competition, thereby tuning and correcting the mean wavelength of the first-direction emission in the SFS 101.

In practice, the SFS 101 in FIG. 1 includes at least an optical fiber doped with RE elements (e.g., Er-doped optical fiber). The doped RE elements can be selected from the group consisting of Yb, Er, Sm, Tm, Ho, Nd, and Pr. In a preferred embodiment, SFS 101 includes: wavelength division multiplexers (WDM's), a pump laser (or called pump light source) for exciting the RE elements in the RE-doped optical fiber, an isolator, and several optical fibers. As is well-known, in harsh environments (e.g., those with a lot of radiation or large temperature variations) the mean wavelength of the SFS 101 may drift a lot due to an increase in the optical fiber loss caused by radiation or a change in the RE gain caused by temperature variations. The mean wavelength drift can be detected by the mean wavelength detection module 102, and corrected by the feedback light control module 100. The function of the wide band splitter 103 is to split the light from the SFS 101. Part of the light is transmitted to the mean wavelength detection module 102, while the rest to the light source output terminal 104. The feedback light control module 100 emits power-tunable pump emissions (e.g., pump laser) or wide-band light of a specific wavelength (e.g., using Er-doped SFS as an example, the specific wavelength has to fall between 1500 nm and 1650 nm). At the same time, the emission of the SFS 101 is reflected to result in the gain competition of the RE elements in the SFS 101. This adjusts and stabilizes the mean wavelength of the SFS 101 due to feedback.

Figure 2:
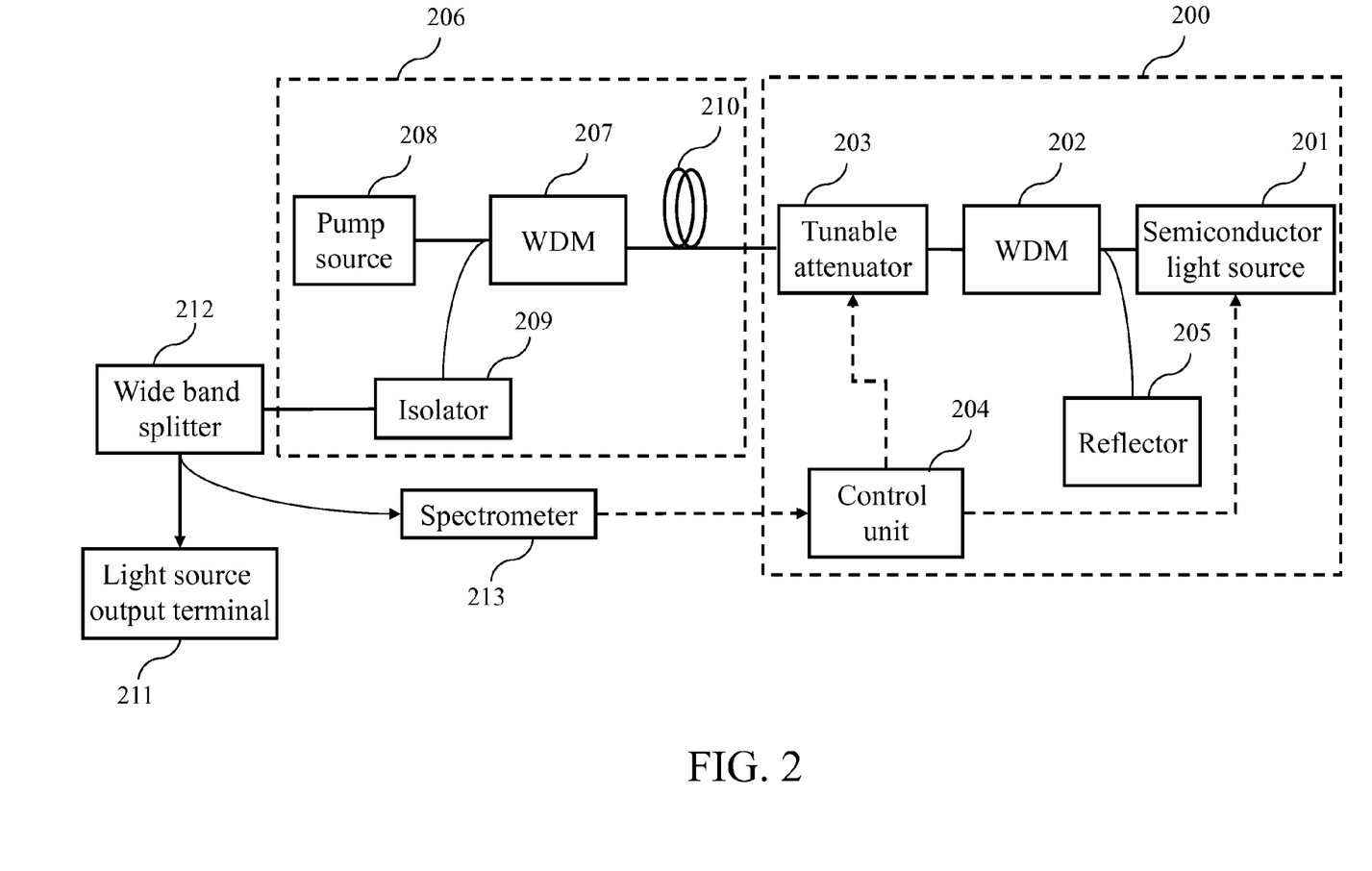
FIG. 2 is a schematic view of the preferred embodiment of the an optical communication system using the feedback light tuning technique.

In practice, as shown in FIG. 2, the feedback light control module 200 includes: a semiconductor light source 201, a wavelength division multiplexer (WDM) 202, a reflector 205, a tunable attenuator 203, and a control unit 204. The semiconductor light source 201 generates light (i.e., semiconductor light such as the power-tunable pump emissions or the wide-band light of a specific wavelength) according to the received driving signal (electrical signal) from the control unit 204. The WDM 202 is connected via the optical fiber to the semiconductor light source 201 and the reflector 205. The WDM 202 is used to divide light into two directions. One connecting to the reflector 205 for reflecting the second-direction emission, and the other connecting to the semiconductor light source 201 transmitting the light emitting from the semiconductor light source 201. The tunable attenuator 203 is connected via an optical fiber to the WDM 202 and the SFS 206 in the optical communication device. An attenuation value is used to attenuate the second-direction emission from the SFS 206 or reflected by the reflector 205, as well as the light passing through the WDM 202 from the semiconductor light source 201. The attenuated light is output as the feedback light. The control unit 204 determines the attenuation value according to the mean wavelength drift transmitted from the mean wavelength detection module 102 (e.g., the spectrometer 213 shown in FIG. 2). When the attenuation value reaches the threshold and the SFS 206 needs gain for tuning mean wavelength, a driving signal is generated and sent to the semiconductor light source. For example, one can use the Newton's method to determine the attenuation value. The attenuation value is converted to the corresponding voltage value for the tunable attenuator 203 to process attenuation.

As described above, the control unit can use the mean wavelength drift transmitted from the mean wavelength detection module 102 to selectively control the tunable attenuator or semiconductor light source or both simultaneously, thereby adjusting the feedback light power. The feedback light can be pump laser, wide-band light, the combination of the pump laser and the reflected second-direction emission, or the combination of the wide-band light and the reflected second-direction emission. The wavelength range of the feedback light falls in the range of the pump laser, the wide-band light, or both of them. Take the SFS with the Er-doped optical fiber as an example. The wavelength of the pump laser is around 980 nm or 1480 nm. The wavelength range of the wide-band light is 1500 nm to 1650 nm.

Please refer to FIG. 2, which is a schematic view of a preferred embodiment of the optical communication system with the feedback light tuning technique. The feedback light control module 200 connects to the SFS 206. In this embodiment, the SFS 206 is a conventional single-pass backward configuration. A 980-nm pump light source 208 emits the pumping light to pass through the 980-nm/1550-nm WDM 207, then the Er-doped optical fiber 210 is excited to generate ASE. The ASE emission has two directions. The one along with the pump light is defined as the second direction, and the other one opposite to it as the first direction. The first-direction emission passes through the 980-nm/1550-nm WDM 207, the isolator 209, and the wide band splitter 212, thereby splitting into two beams with 99% and 1% power. The beam with 99% power is output to the light source output terminal 211. The beam with 1% power is sent to the spectrometer 213 (i.e., the mean wavelength detection module 102). The function of the isolator 209 is to prevent reflective light by following components from affecting the stability of the SFS 206. The function of the spectrometer 213 is to detect the mean wavelength of the SFS 206. The value of the mean wavelength is transmitted by electrical signals to the control unit 204 in the feedback light control module 200. The function of the control unit 204 is to output two control signals according to a program to the tunable attenuator 203 and the semiconductor light source 201 of wavelength 1480 nm. The function of the tunable attenuator 203 is to adjust the power of the feedback light of the feedback light control module 200. The function of the 1480-nm semiconductor light source 201 generates pump light to excite the Er-doped optical fiber 210, thereby adjusting the power and wavelength of the second-direction emission. The power of the 1480-nm semiconductor light source 201 is lower than that of the 980-nm pump light source 208. The primary source of the feedback light is the second-direction emission generated by the Er-doped optical fiber 210. The emission is first attenuated by the tunable attenuator 203, and then passes through the 1480-nm/1550-nm WDM 202. It is reflected by the reflector 205 to go through the same path. The emission is attenuated for the second time by the tunable attenuator 203, followed by entering the Er-doped optical fiber 210. At this moment, the feedback light competes the gain of the Er ions with the original first-direction emission. The spectrum of the SFS 206 is changed so that the mean wavelength changed. The entire feedback control process stabilizes the mean wavelength. It should be noted that the optical communication system with the feedback light tuning technique can be considered as a light source or light amplifier in practice.

Figure 3:
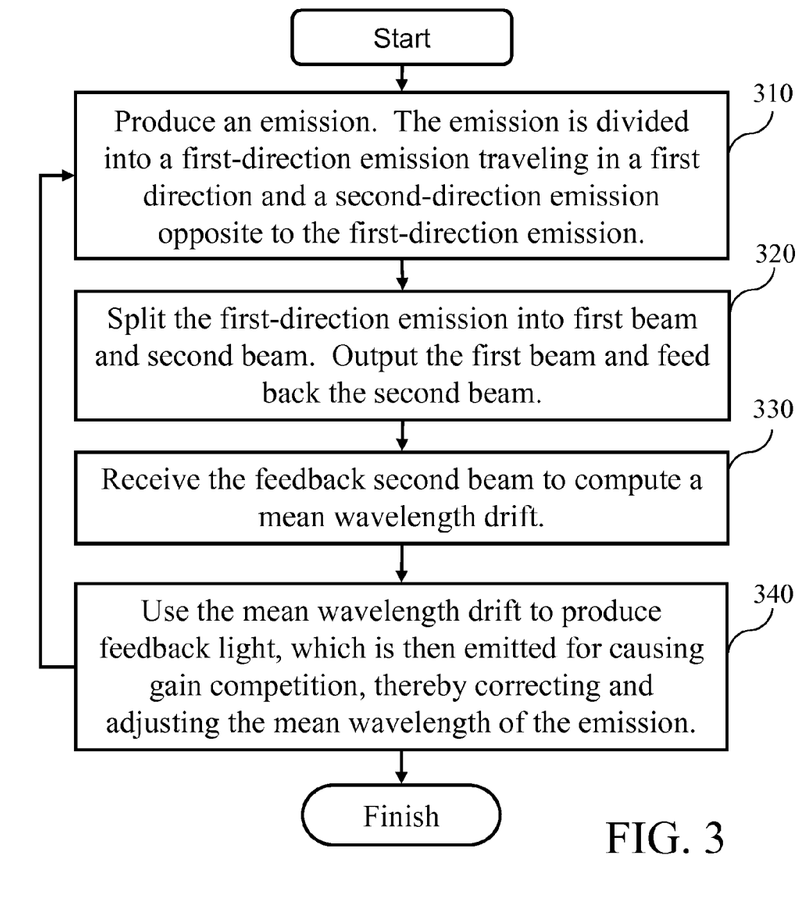
FIG. 3 is a flowchart of the disclosed optical communication method using the feedback light tuning technique.

FIG. 3 is a flowchart of the disclosed optical communication method with the feedback light tuning technique. The method includes the steps of: producing emission transmitted in a first direction and a second direction opposite to the first direction (step 310); splitting the first-direction emission into a first beam and a second beam, and outputting the first beam and feeding back the second beam (step 320); receiving the feedback second beam to compute a mean wavelength drift (step 330); producing feedback light according to the mean wavelength drift and emitting the feedback light to cause gain competition, thereby correcting and tuning the mean wavelength of the emission (step 340). Through the above-mentioned steps, the mean wavelength drift up to 30 nm or 19400 ppm can be completely corrected by the feedback light tuning technique. The mean wavelength of the emitted light is thus stabilized in various harsh environments that cause drifts. Moreover, the range of acceptable radiation dose is also increased.

In practice, step 340 uses the mean wavelength drift to control a tunable attenuator 203 and a semiconductor light source 201 or one of the two, thereby adjusting the power of the feedback light. The control of the tunable attenuator 203 is to set an attenuation value, with which all light passing through the tunable attenuator is attenuated. When the control unit 204 determines the need of gain, it generates a driving signal to drive the semiconductor light source 201 to produce semiconductor light.

Figure 4:
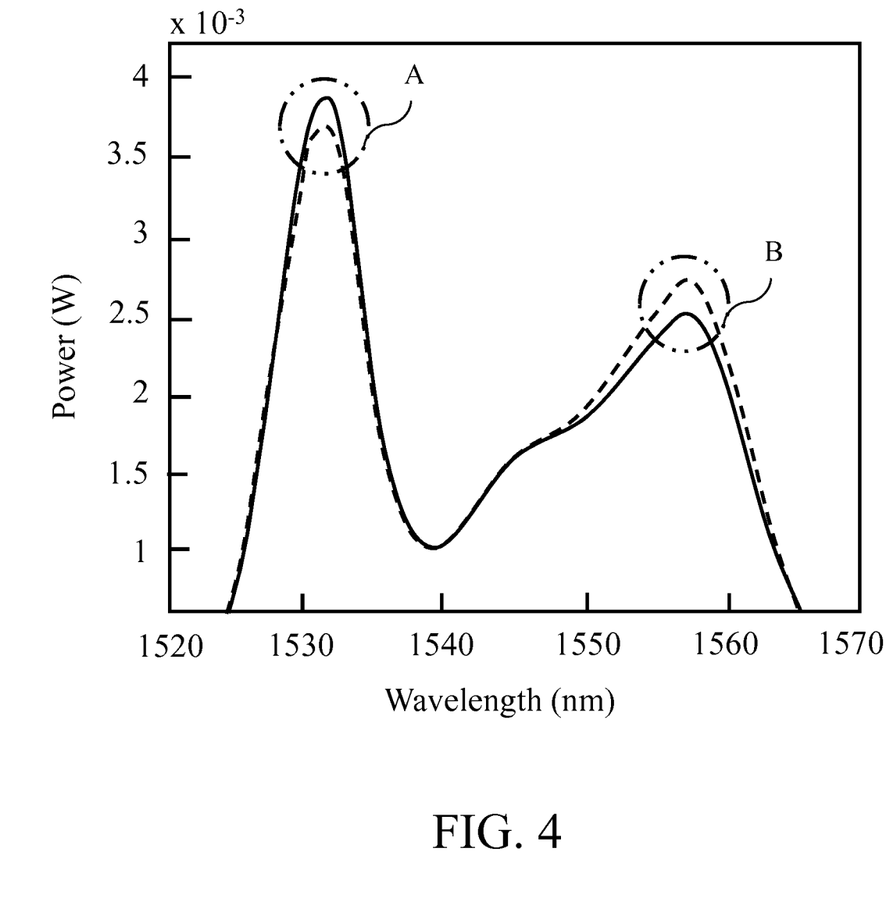
FIG. 4 compares the SFS spectra measured before and after tuning the feedback light power under the structure of FIG. 2.

Please refer to FIG. 4. The plot compares the SFS spectra measured before and after the feedback light tuning under the structure of FIG. 2. As shown in FIG. 4, the feedback light power can adjust the spectrum of the SFS as well as the mean wavelength. The solid curve gives the result of a lower feedback light power, and the dashed curve that of a higher feedback light power. The mean wavelengths of the solid and dashed curves are different, with the latter longer than the former by 0.57 nm, equivalent to 370 ppm. In the circled region marked by "A" in FIG. 4, the peak around 1532 nm for the solid curve is higher than that for the dashed curve. In the circled region marked by "B", the peak around 1557 nm for the dashed curve is higher than that for the solid curve instead. Such a phenomenon shows gain competition of Er-doped fibers. This is one of the primary physical mechanisms that realize mean wavelength stabilization by feedback light tuning.

Figure 5:
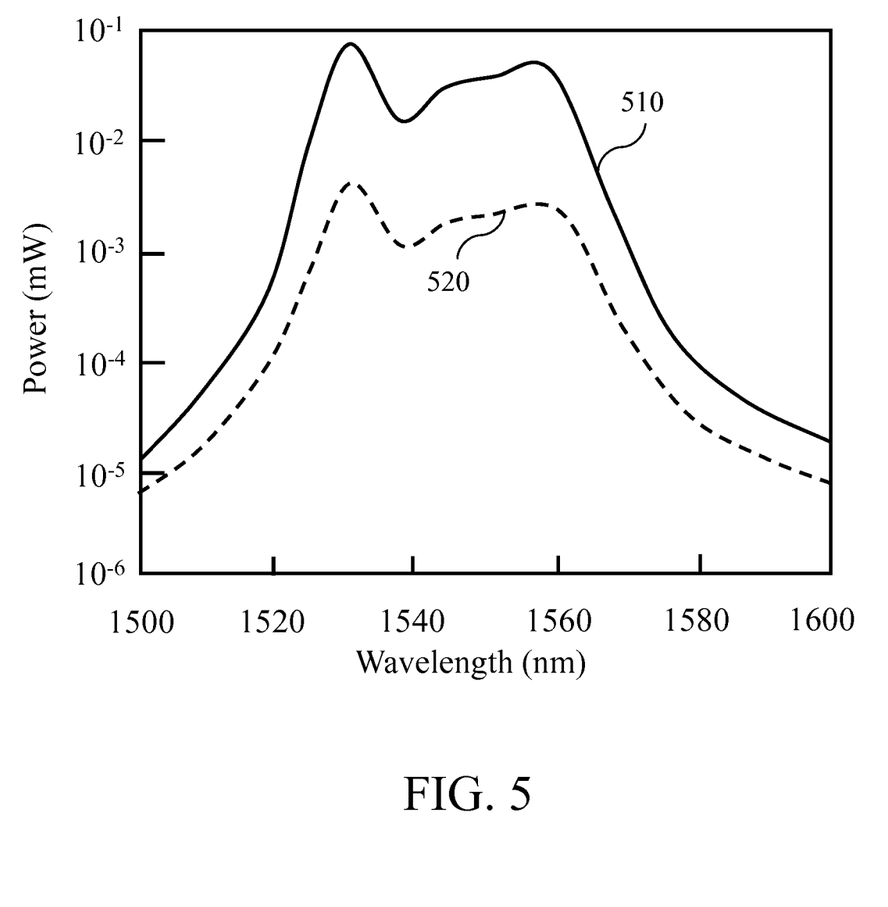
FIG. 5 compares the SFS spectra measured before and after radiation of 200-krad γ-ray under the structure of FIG. 2.

Please refer to FIG. 5. The plot compares the spectra of the SFS measured before and after the radiation of 200-krad γ-ray under the structure of FIG. 2. As shown in the plot, the spectra of the SFS before and after the radiation are similar, with essentially no drift in the mean wavelength. The solid curve is the SFS spectrum 510 before the radiation. It has an output power of 46.5 mW and a bandwidth greater than 30 nm. The 980-nm pump power is 290 mW. The 1480-nm pump power is 0 mW. The dashed curve is the SFS spectrum 520 after the radiation. Using the attenuation value of the tunable attenuator by feedback control, the 1480-nm pump power is increased to 90 mW. The output power drops down to 2.9 mW due to radiation effects. However, the bandwidth is still greater than 30 nm, and the mean wavelength is almost the same as that of the solid curve (e.g., the SFS spectrum 510 before the radiation). The error (standard deviation) in a long-time measurement is about 2.6 ppm.

Figure 6:
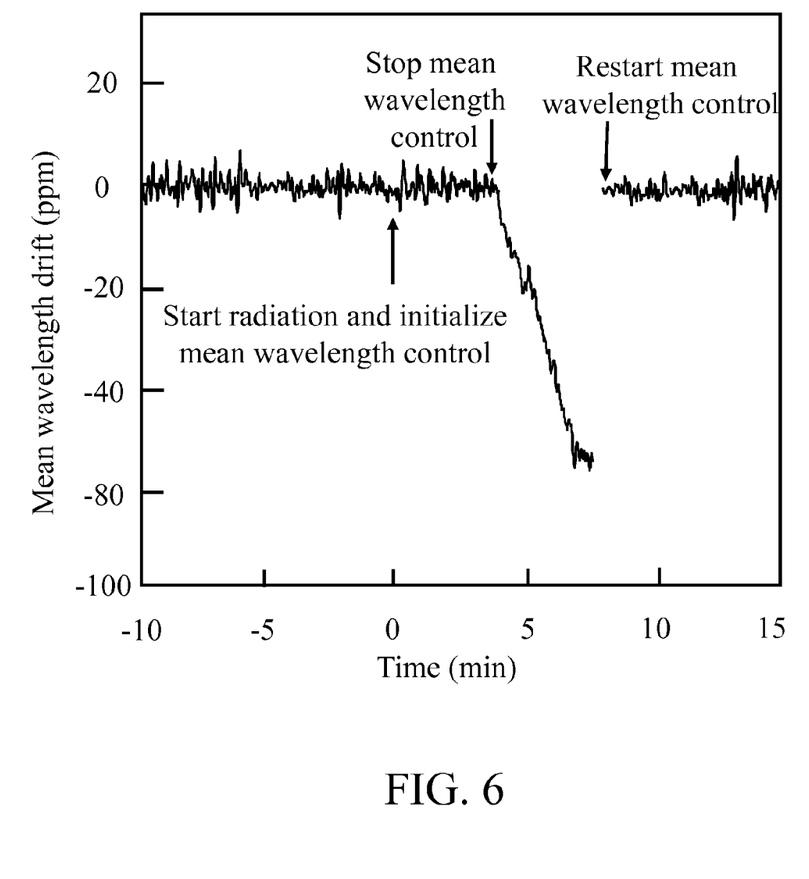
FIG. 6 shows the mean wavelength drift before and after radiation under the structure of FIG. 2.

Please refer to FIG. 6, which is a schematic view of the mean wavelength drift before and after the radiation under the structure of FIG. 2. The horizontal axis is time (in units of minutes), and the vertical axis is the mean wavelength drift (in units of ppm). The mean wavelength drift in usual work environments remains in a fixed range. Once radiation starts and the disclosed feedback light tuning technique is not activated yet (e.g., turning off the mean wavelength control), FIG. 6 shows clearly that the mean wavelength has a drift. Until the disclosed feedback light tuning technique starts, the mean wavelength drift then resume the original range before the radiation. Therefore, FIG. 6 shows that the disclosed feedback light tuning technique can be applied to harsh environments (e.g., with high radiation) to reduce the mean wavelength drift due to environmental changes.

In summary, for a SFS in harsh environments one can employ the disclosed feedback light tuning technique to stabilize the change in the gain of the doped RE elements in the optical fiber due to the environments, resulting in mean wavelength drifts. Therefore, the feedback light tuning technique disclosed herein is most suitable for operations under a severe temperature variation or radiation, such as in the space or a nuclear power plant.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A feedback light tuning device used in an optical communication device having a superfluorescent fiber source (SFS) and a light source output terminal, the device comprising:
    a wide band splitter, which is connected with the SFS in the optical communication device via an optical fiber for receiving a first-direction emission emitted by the SFS, splitting the first-direction emission into a first beam and a second beam, with the first beam being output to the light source output terminal and the second beam being fed back;
    a mean wavelength detection module, which is connected to the wide band splitter via an optical fiber for receiving the second beam fed back from the wide band splitter to compute a mean wavelength drift; and
    a feedback light control module, which is electrically connected to the mean wavelength detection module and connected via an optical fiber with the SFS in the optical communication device for receiving a second-direction emission emitted by the SFS in the direction opposite to the first-direction emission and producing feedback light according to the mean wavelength drift transmitted from the mean wavelength detection module and emitting the feedback light to the SFS for causing gain competition, thereby correcting and tuning the mean wavelength of the first-direction emission emitted by the SFS.

2. The feedback light tuning device of claim 1, wherein the feedback light control module includes:
    a semiconductor light source for generating semiconductor light according to a received driving signal;
    a wavelength division multiplexer (WDM) connected to the semiconductor light source via an optical fiber for wavelength division multiplexing the second-direction emission passing through the WDM and the semiconductor light from the semiconductor light source according to the wavelength;
    a reflector for reflecting the second-direction emission that is wavelength division multiplexed by the WDM;
    a tunable attenuator connected with the WDM and the SFS in the optical communication device via optical fibers for using an attenuation value to attenuate the second-direction emission from the SFS or reflected by the reflector and to attenuate the semiconductor light that is wavelength division multiplexed by the WDM, with all the attenuated light being output as feedback light; and
    a control unit for determining the attenuation value according to the mean wavelength drift transmitted from the mean wavelength detection module and for generating the driving signal and sending the driving signal to the semiconductor light source when the attenuation value is determined to reach a threshold and the SFS has the need of gain.

3. The feedback light tuning device of claim 2, wherein the control unit uses the mean wavelength drift transmitted from the mean wavelength detection module to selectively control the tunable attenuator, the semiconductor light source, or both of them simultaneously to adjust the power of the feedback light.

4. The feedback light tuning device of claim 1, wherein the feedback light is from a pump laser, wide-band light, a combination of the pump laser and the second-direction emission, or a combination of the wide-band light and the second-direction emission.

5. The feedback light tuning device of claim 1, wherein the wavelength range of the feedback light is within the wavelength of a pump laser or wide-band light or both.

6. An optical communication system using a feedback light tuning technique to output light via a light source output terminal, the system comprising:
    an superfluorescent fiber source (SFS) for producing an emission, which is divided according to the transmission direction into a first-direction emission and a second-direction emission opposite to the first-direction emission;
    a wide band splitter, which is connected with the SFS via an optical fiber for receiving the first-direction emission and splitting the first-direction emission into a first beam and a second beam, with the first beam being output to the light source output terminal and the second beam being fed back;

a mean wavelength detection module, which is connected to the wide band splitter via an optical fiber for receiving the second beam fed back from the wide band splitter to compute a mean wavelength drift; and a feedback light control module, which is electrically connected to the mean wavelength detection module and connected via an optical fiber with the SFS in the optical communication device for receiving a second-direction emission emitted by the SFS in the direction opposite to the first-direction emission and producing feedback light according to the mean wavelength drift transmitted from the mean wavelength detection module and emitting the feedback light to the SFS for causing gain competition, thereby correcting and tuning the mean wavelength of the first-direction emission emitted by the SFS.

7. The optical communication system of claim 6, wherein the feedback light control module includes:

a semiconductor light source for generating semiconductor light according to a received driving signal;

a wavelength division multiplexer (WDM) connected to the semiconductor light source via an optical fiber for wavelength division multiplexing the second-direction emission passing through the WDM and the semiconductor light from the semiconductor light source according to the wavelength;

a reflector for reflecting the second-direction emission that is wavelength division multiplexed by the WDM;

a tunable attenuator connected with the WDM and the SFS in the optical communication device via optical fibers for using an attenuation value to attenuate the second-direction emission from the SFS or reflected by the reflector and to attenuate the semiconductor light that is wavelength division multiplexed by the WDM, with all the attenuated light being output as feedback light; and a control unit for determining the attenuation value according to the mean wavelength drift transmitted from the mean wavelength detection module and for generating the driving signal and sending the driving signal to the semiconductor light source when the attenuation value is determined to reach a threshold and the SFS has the need of gain.

8. The optical communication system of claim 7, wherein the control unit uses the mean wavelength drift transmitted from the mean wavelength detection module to selectively control the tunable attenuator, the semiconductor light source, or both of them simultaneously to adjust the power of the feedback light.

9. The optical communication system of claim 6, wherein the feedback light is from a pump laser, wide-band light, a combination of the pump laser and the second-direction emission, or a combination of the wide-band light and the second-direction emission.

10. The optical communication system of claim 6, wherein the wavelength range of the feedback light is within the wavelength of a pump laser or wide-band light or both.

11. The optical communication system of claim 6, wherein the SFS includes at least an optical fiber doped with a rare earth (RE) element selected from the group consisting of Yb, Er, Sm, Tm, Ho, Nd, and Pr.

12. An optical communication method using a feedback light tuning technique, comprising the steps of:

producing an emission, which is divided according to the transmission direction into a first-direction emission and a second-direction emission opposite to the first-direction emission;

splitting the first-direction emission into a first beam and a second beam, outputting the first beam, and feeding back the second beam;

computing a mean wavelength drift according to the feedback second beam; and producing feedback light according to the mean wavelength drift and emitting the feedback light for causing gain competition, thereby correcting and tuning the mean wavelength of the emission.

13. The optical communication method of claim 12, wherein the step of producing feedback light control a tunable attenuator and a semiconductor light source or one of them according to the mean wavelength drift, thereby tuning the feedback light power.

14. The optical communication method of claim 13, wherein the step of controlling the tunable attenuator sets an attenuation value with which all light passing through the tunable attenuator is attenuated.

15. The optical communication method of claim 13, wherein the step of controlling the semiconductor light source generates a driving signal to drive the semiconductor light source to produce and emit semiconductor light when gain is required.

16. The optical communication method of claim 12, wherein the feedback light is produced by a superfluorescent fiber source (SFS) having at least an optical fiber doped with a rare earth (RE) element selected from the group consisting of Yb, Er, Sm, Tm, Ho, Nd, and Pr.

* * * * *